United States Patent Office 2,717,463
Patented Sept. 13, 1955

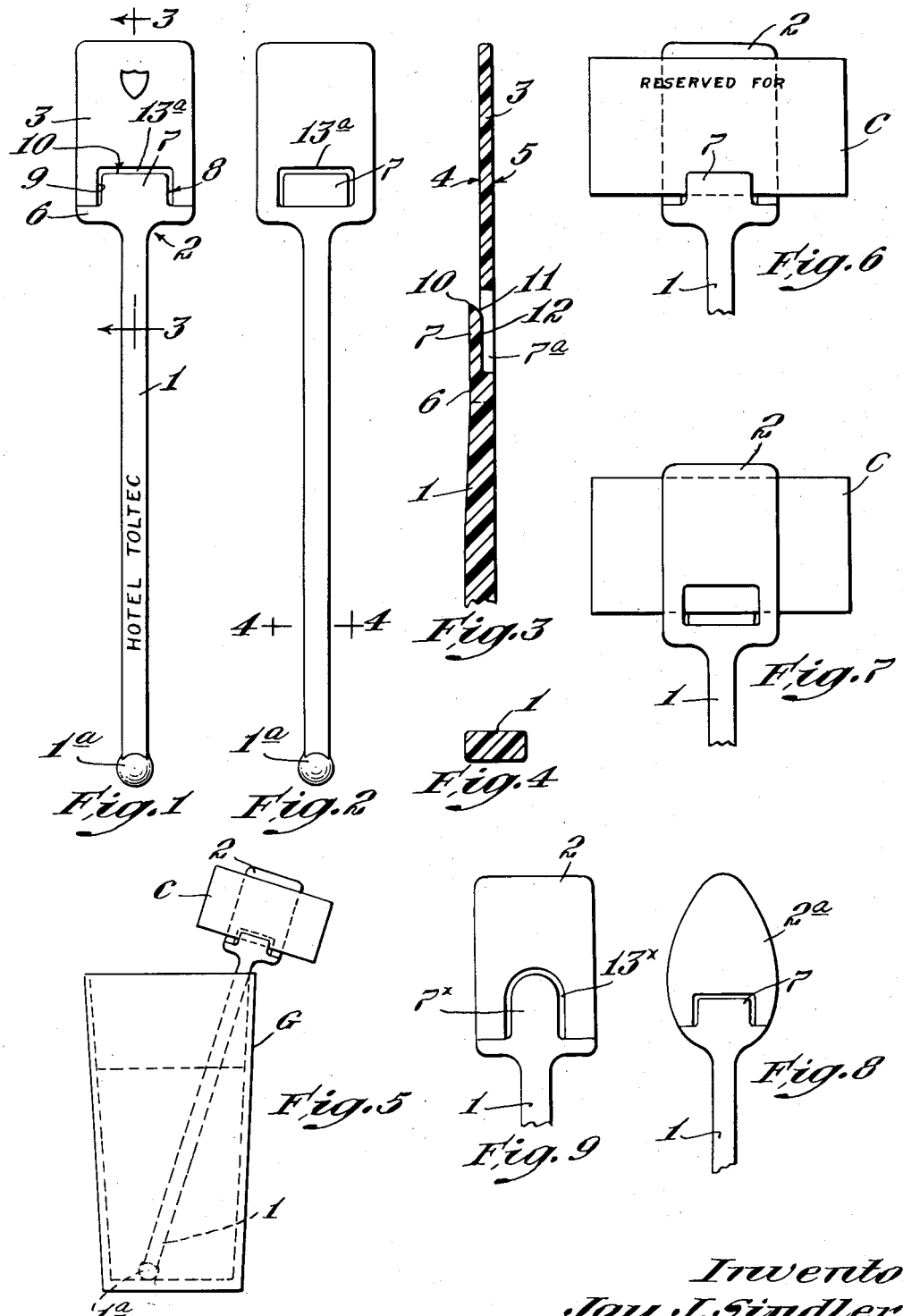

2,717,463

COMBINED STIRRING IMPLEMENT AND CARD HOLDER

Jay J. Sindler, Boston, Mass., assignor to Spir-It, Inc., Malden, Mass., a corporation of Massachusetts Application February 21, 1952, Serial No. 272,854

2 Claims. (Cl. 40—11)

This invention pertains to table flatware and more especially to a stirring implement particularly designed for use in stirring or mixing drinks, as, for instance, highballs, iced tea, etc., containing liquids to which have been added ice, sugar, sliced lemon or the like. The implement of the present invention is of that kind in which a relatively broad, flat portion, hereinafter called the "easel portion" is attached to one end of a relatively narrow shank or stem of such length and proportion that, when moved round and round or up and down within the contents of a drinking glass or mixing container, the contents are agitated, blended, mixed or rendered more homogeneous. Because such an implement may be produced cheaply, it is sometimes used as a give-away advertising device for patrons of eating and drinking establishments, the flat surfaces of the implement being particularly well suited to have imprinted upon them the name of the establishment or the like. If the device is to be given away, it is usually made of material cheaper and/or easier to work than metal, as, for instance, a normally hard and shape-retaining synthetic plastic, wood or waterproofed paper, and on its easel portion, or on the flat surfaces of the shank, the desired words or symbols are imprinted, although the use of metal is by no means precluded.

Since a device of this kind is usually served in upright position within a drinking glass with its easel portion exposed above the rim of the glass, or laid out on the table or bar beside the glass, or in association with other eating implements, it occupies a conspicuous position where it quickly catches the eye of the customer, especially if it be of a pleasing, brilliant color which is readily possible if it be made of synthetic plastic.

The easel portion of the device is flat and of substantial breadth (as compared with the breadth of the shank), and thus the easel provides a very desirable location for advertising copy, slogans, etc. However, were such advertising copy imprinted directly on the easel, it would be permanent and not readily changed, except by discarding the implement and replacing it with another imprinted with the new advertising copy, symbols or marks, a procedure which in many cases would be unduly expensive.

The present invention has for objects the provisions of a stirring implement of the above type, but so devised as to provide for ready exchange of advertising matter which it carries; to make possible the provision for a much greater area for the exhibit of advertising or other matter than is provided on the surfaces of the implement itself; to provide an implement which, without interference with its alternate function as a stirrer, may form an easel or holder for a removable card or the like, whereby, for instance, the implement may constitute a place-card holder; to provide an implement so designed as to permit a card or equivalent element to be attached or removed in the simplest possible way; and to provide a stirring implement having the above novel characteristics, which, if desired, may be made cheaply enough to serve as a give-away advertising device. Other and further objects and advantages will be delineated in the following more detailed description and by reference to the accompanying drawings wherein:

Fig. 1 is a front elevation of a stirring implement embodying the present invention;

Fig. 2 is a rear elevation of the implement of Fig. 1;

Fig. 3 is a fragmentary, longitudinal section on the lines 3—3 of Fig. 1, to larger scale;

Fig. 4 is a transverse section on the line 4—4 of Fig. 2, to larger scale;

Fig. 5 is a perspective view, to smaller scale, illustrating the normal purpose and mode of use of the implement;

Fig. 6 is a fragmentary front elevation of the easel portion of the implement, showing how it may be used to hold a card;

Fig. 7 is a rear elevation of the parts shown in Fig. 6;

Fig. 8 is a fragmentary front elevation illustrating a slight modification; and

Fig. 9 is a view similar to Fig. 8 but illustrating a further modification.

Referring to the drawings, the numeral 1 designates the shank or stem portion of the implement, shown here provided with a ball or knob 1$^a$ at its lower end which may be found useful, for example, in expressing the juice from a slice of lemon or lime within the glass G. However, any other desired shape or finish for this end of the implement may be provided. At its opposite end 2, the shank 1 merges integrally with the easel portion 3, the latter, as shown in Figs. 1–7, being substantially rectangular in contour, elongate in the direction of the axis of the shank, and having smoothly rounded corners and edges. As illustrated in Fig. 5, the stem 1 is of such length that when its lower end rests upon the bottom of a highball glass, the stem supports the easel above the level of the rim of the glass. As above suggested, the implement may be made of various materials, but, in a preferred construction, it consists of a unitary mass of a synthetic resin of the methylmethacrylate type or one of the styrene resins, such resins being capable of receiving any desired color, and, if desired, being transparent or colorless. Such resins are capable of being molded to desired shape, and it is contemplated that the instrument of the present invention will be produced as an integral molded mass, though by no means precluded is the possibility of making the easel section of the implement a separate unit, to be attached or adhered to a stirring shank like or similar to that shown in Figs. 1, 2 and 5.

As illustrated in Fig. 3, the main part of the easel portion 3 is flat and thin, for example, it may be of the order of 2 mm. in thickness and of a transverse width substantially greater than that of the stem, as here illustrated, approximately five times that of the stem. The main portion 3 of the easel has a smooth, flat front face 4 and a parallel, smooth flat rear face 5. As illustrated in Figs. 1 and 3, that portion of the easel which is joined to the shank is thickened to form a rib 6, which projects forwardly from the plane of the front face 4, and transversely extends across the width of the easel and is substantially flush with the lower end of the easel. The card-retaining tongue or clip 7 is integrally joined at its base to this rib 6, the tongue extending upwardly from the rib in uniform parallel relation to the easel portion 3 but being of substantially less height than the main portion 3 (as illustrated, not exceeding one-fifth of the height of the part 3) so that it will obstruct only a small area of the lower portion of a card mounted in the easel. This tongue is bounded on its sides by the edges 8 and 9 (Fig. 1) and at its top by the edge 10. As illustrated, the tongue is symmetrically disposed with respect to the right and left edges of the part 3 and is of a width substantially less than the part 3. The top edge of the tongue, as viewed in Fig. 3, is beveled so that it inclines downwardly and rearwardly, thus providing a guiding surface to facilitate the insertion of a card between the tongue and the major surface of the easel. The tongue, as shown in Fig. 1, is of generally rectangular contour and, immediately behind this tongue, the easel portion 3 is provided with an aperture 7ª which is likewise of substantially rectangular contour and of slightly greater dimensions than the tongue 7 so that, when the implement is viewed as shown in Fig. 1, the tongue appears to be surrounded by the inverted, U-shaped slot 13ª.

The rear surface 12 of the tongue 7 may be in the plane of the front face 4 of the easel, or it may be slightly offset forwardly from said plane according to the thickness of the card which is to be used with the device. However, the slight resiliency of the tongue 7, and the flexibility of the card to be used with the implement, both operate to maintain a frictional juxtaposition of the surfaces of the card and contiguous surfaces of the easel.

Even though the tongue 7 should not flex forwardly when the card is introduced, the provision of the aperture in the easel, directly behind the tongue, permits a portion of the card to bulge rearwardly as it is slipped down behind the tongue so that the card may be readily inserted even if the tongue 7 be rigid. Thus, in either case, the card is easily inserted, is firmly held in position, but is readily removed at will.

Since the dimensions of the card are not restricted by the means whereby it is secured to the implement, it is possible to attach a card capable of carrying a substantial amount of advertising matter or other material, in fact, far more than could be applied to the implement itself, and since the card may be readily removed and replaced by another, it is possible to change the advertising matter or other material as often as desired, using the same implement as a holder for the substituted card.

The implement is very desirable for holding a place-card since the implement itself is ornamental in appearance and provides attractive means for calling attention to the location of the card. When once the card has served its purpose, the user may, if he so desire, remove it from the implement before employing the latter for its other use, to wit, as a stirrer.

While the easel portion illustrated in Figs. 1-7 is substantially rectangular in contour, it is obviously within the scope of the invention to make the paddle portion of other shape, and thus, for example as illustrated in Fig. 8, it might, if desired, be made to resemble in outside contour an ordinary spoon, although still being a flat easel whose front and rear surfaces are parallel. Other shapes of easel are obviously within the purview of the invention. Likewise the shape of the shank may be varied in accordance with any desired ornamental or utilitarian effects which may be preferred. For example, an eating or stirring spoon or prong may be provided in substitution for the ball or knob 1ª shown in the drawings.

As illustrated in Figs. 1, 2, 6, 7 and 8, the tongue 7 is substantially rectangular and the aperture 13ª is of similar contour, although the tongue and aperture may be of other shapes, for example as shown in Fig. 9, where the tongue 7ˣ and aperture 13ˣ are bounded in part by curved lines.

While, as above suggested, the implement may be made from a synthetic resin, it is obvious that it may be made of other materials, depending upon the way in which it is to be used. If, for example, it is expected to be given away, it may be made of even cheaper material than the synthetic plastic, for example, thin wood or a paper stock suitably treated to make it waterproof and to have the desired stiffness. On the other hand, if the implement is to be a permanent piece of the eating equipment of a restaurant, it may be made of metal, as, for example, of silverplate or of sterling silver, or of glass or other appropriate material.

While certain embodiments of the invention have herein been illustrated and described by way of example, it is to be understood that any and all modifications falling within the scope of the appended claims are to be regarded as within the scope of the invention.

I claim:

1. A device of the class described comprising an elongate supporting stem and an easel, the easel having a rib projecting from one face thereof, said rib extending transversely across and being substantially flush with one end of said easel, a resilient tongue integral with said rib and which is substantially uniformly parallel to the last-named face of the easel being offset forwardly from the latter to provide a card-receiving slot, the tongue being of a height less than one-half the easel proper and being of lesser width than the easel proper and being symmetrically arranged with respect to the right and left edges of the easel, the easel proper having an aperture symmetrical with respect to the tongue and disposed directly behind the tongue into which a portion of a card in entering the slot may be deflected by the pressure of the tongue.

2. A device of the class described consisting of a unitary mass of a hard, shape-retaining but somewhat resilient synthetic resin and comprising an elongate, relatively narrow supporting stem having a relatively broad easel portion integrally joined therewith at its upper end, the easel being of substantially uniform thickness and having flat opposite faces but having a rib extending transversely of the width of the easel and projecting from one face thereof, said rib being adjacent to the junction of the easel and the stem, an inwardly and downwardly beveled tongue integrally joined to and projecting from the rib in a substantially uniform parallel relation to the last-named face of the easel but spaced forwardly from said face a distance to provide a card-receiving slot, the tongue being of substantially less height and width than the easel proper and being arranged symmetrically with respect to the right and left edges of the easel proper, the easel having an aperture disposed behind and symmetrical with respect to said tongue, the tongue being of lesser width and height than said aperture, said aperture providing a space into which a portion of a card in entering the slot may be deflected by the pressure of the tongue, the tongue cooperating with the aperture to provide retaining means for removably securing a card to the easel portion.

References Cited in the file of this patent

UNITED STATES PATENTS

| | | |
|---|---|---|
| 1,486,789 | Nickel | Mar. 11, 1924 |
| 2,040,750 | Long | May 12, 1936 |
| 2,042,813 | Turbush | June 2, 1936 |
| 2,462,757 | Loycz | Feb. 22, 1949 |
| 2,510,551 | Cardillo | June 6, 1950 |

FOREIGN PATENTS

| | | |
|---|---|---|
| 220,401 | Great Britain | Aug. 21, 1924 |